United States Patent
Ferrand

(10) Patent No.: US 6,550,137 B1
(45) Date of Patent: Apr. 22, 2003

(54) TOOL AND METHOD FOR SHEATHING OF CABLES

(75) Inventor: Jean Henri Ferrand, Crepy-en-Valois (FR)

(73) Assignee: Federal-Mogul Systems Protection Group S.A.S., Crepy-en-Valois (FR)

(*) Notice: Subject to any disclaimer, the term of this patent is extended or adjusted under 35 U.S.C. 154(b) by 0 days.

(21) Appl. No.: 09/402,406
(22) PCT Filed: Mar. 23, 1998
(86) PCT No.: PCT/EP98/01900
§ 371 (c)(1), (2), (4) Date: Jan. 10, 2000
(87) PCT Pub. No.: WO98/45914
PCT Pub. Date: Oct. 15, 1998

(30) Foreign Application Priority Data

Apr. 4, 1997 (FR) .................................. 97 04150

(51) Int. Cl.[7] ............................................. H01R 43/00
(52) U.S. Cl. ................ 29/868; 29/33 E; 29/33 F; 29/33 M; 29/235; 29/234; 29/754; 29/755; 29/758; 29/764; 29/828
(58) Field of Search ........................... 29/235, 234, 868, 29/33 E, 33 F, 758, 764, 33 M, 754, 755, 828

(56) References Cited

U.S. PATENT DOCUMENTS

| | | | |
|---|---|---|---|
| 2,743,884 A | | 5/1956 | Briggs .................... 242/96 |
| 3,488,828 A | * | 1/1970 | Gallagher |
| 3,819,434 A | * | 6/1974 | Dembiak .................. 156/54 |
| 3,944,459 A | * | 3/1976 | Skobel ................... 156/461 |
| 4,151,365 A | * | 4/1979 | Hacker ................... 174/107 |
| 4,279,470 A | * | 7/1981 | Portinari ................. 350/96.23 |
| 4,482,413 A | * | 11/1984 | Bohannon ................. 156/54 |
| 4,593,442 A | | 6/1986 | Wright et al. ............ 29/235 |
| 4,607,430 A | * | 8/1986 | Young .................... 29/868 |
| 4,622,092 A | * | 11/1986 | Bohannon ................. 156/461 |
| 4,821,398 A | * | 4/1989 | Hillstead ................ 29/450 |
| 4,958,423 A | * | 9/1990 | Mori ..................... 29/235 |
| 5,136,767 A | * | 8/1992 | Blecher .................. 29/235 |
| 5,293,501 A | * | 3/1994 | Bennet ................... 174/135 |
| 5,299,347 A | * | 4/1994 | Decker ................... 29/235 |
| 5,635,678 A | * | 6/1997 | Yasukuni ................. 174/152 |
| 5,636,422 A | * | 6/1997 | Pyron .................... 29/235 |
| 5,862,578 A | * | 1/1999 | Castleman ................ 29/235 |
| 5,868,584 A | * | 2/1999 | Cook ..................... 439/98 |
| 6,049,960 A | * | 4/2000 | Pilling .................. 29/450 |

FOREIGN PATENT DOCUMENTS

EP      0 742 624     11/1996     ............ H02G/1/08

OTHER PUBLICATIONS

Patent Abstracts of Japan, vol. 6, No. 112 (P–124), Jun. 23, 1982 & JP 042007 A (Nippon Denshin Denwa Kosha), Mar. 9, 1982 (see abstract).

* cited by examiner

Primary Examiner—Peter Vo
Assistant Examiner—Paul Kim
(74) Attorney, Agent, or Firm—Synnestvedt & Lechner LLP

(57) ABSTRACT

The device is a tool for placing a split sheath around elongated items such as bundles of electronic cables. It comprises a guide bush which makes possible the opening of the sheath, a duct for the cables to be sheathed, lateral grooves for guiding the open sheath and is characterized by the presence of a lateral opening which allows the introduction or extraction of cables possibly already fixed at their two extremities during the use of the tool, as well as by the angle which there is between this opening and the duct for the cables in a manner to keep them in position in the tool be their own rigidity. The tool may have a handle for manipulation and for setting the tool in relative motion along the cables to be sheathed. The invention is also directed at the method for using the tool.

12 Claims, 3 Drawing Sheets

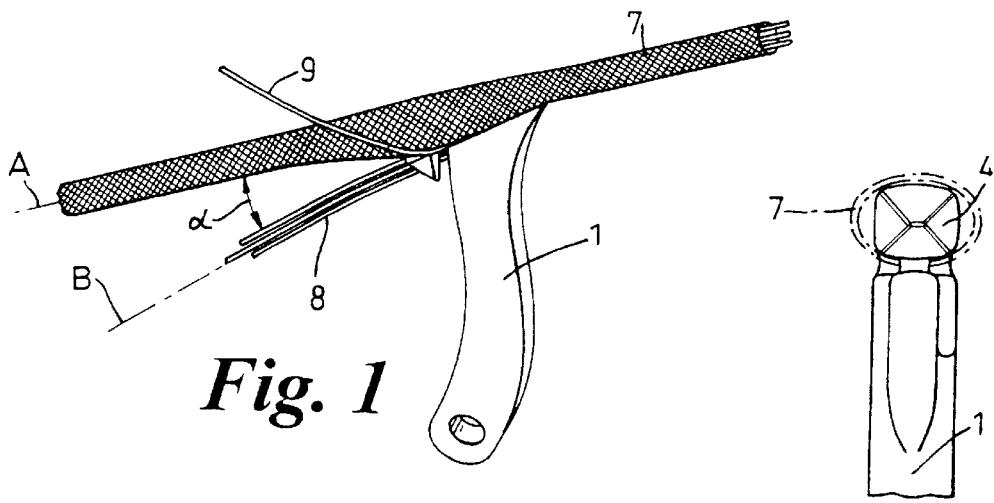
Fig. 1
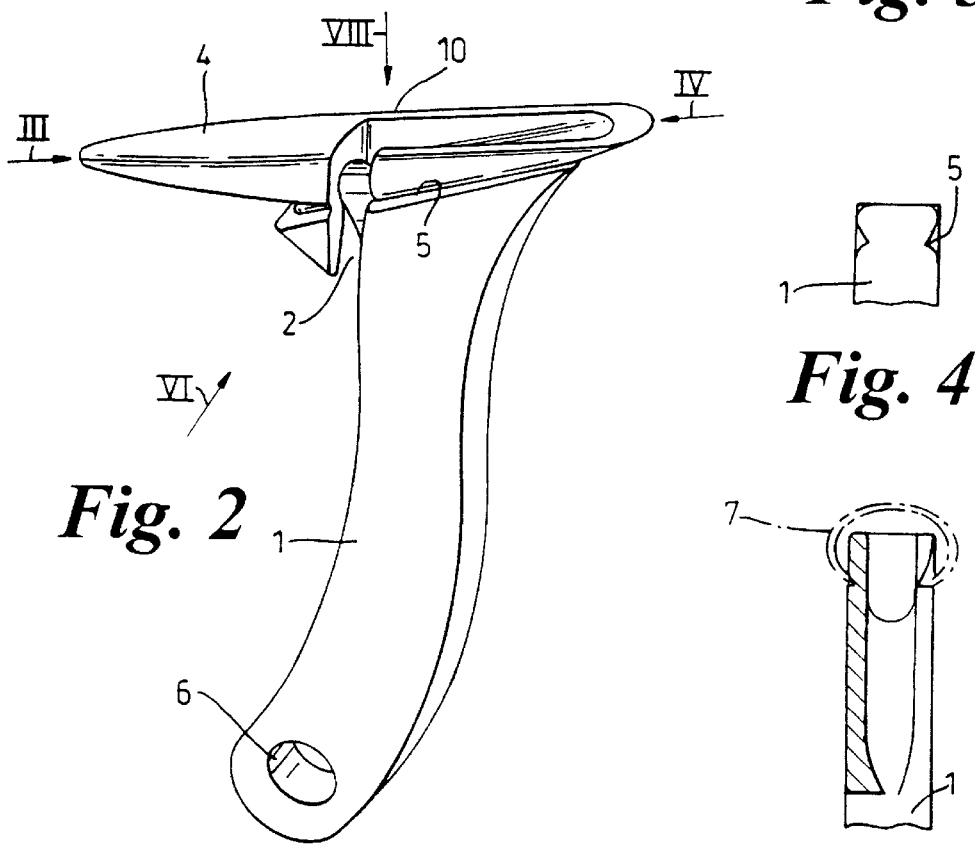
Fig. 2
Fig. 3
Fig. 4
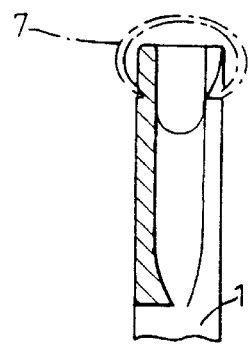
Fig. 5

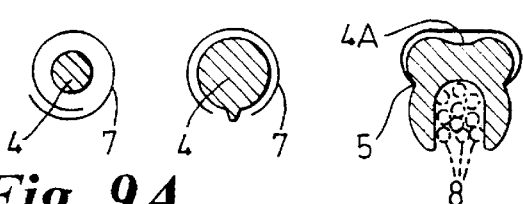
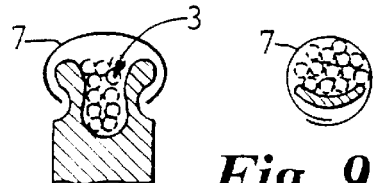
Fig. 9A  Fig. 9B  Fig. 9C  Fig. 9D  Fig. 9E
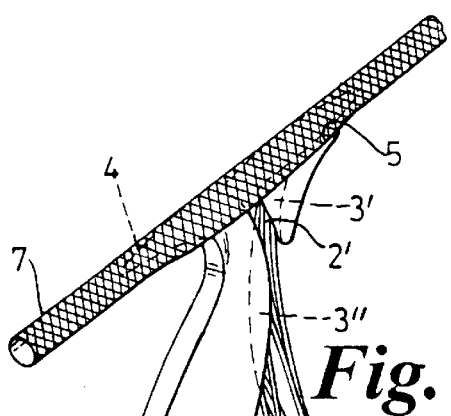
Fig. 10
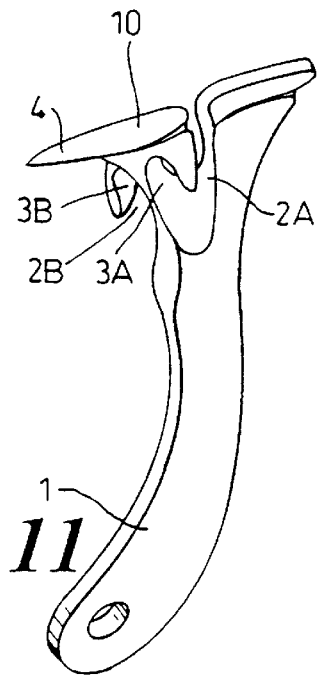
Fig. 11
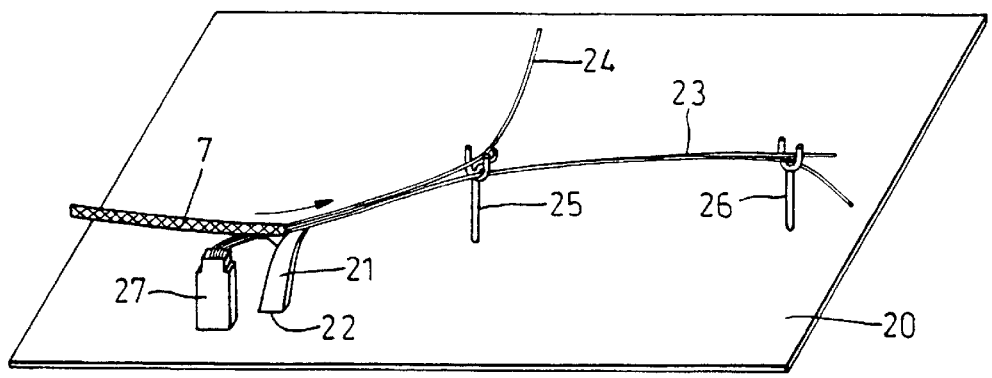
Fig. 12

TOOL AND METHOD FOR SHEATHING OF CABLES

FIELD OF THE INVENTION

This invention relates to tools for installing generally tubular sheathing, such as split ringed sheathing, around elongated items, such as bundles of electric cables. Nowadays, many types of tool are known for the application of such sheathing.

BACKGROUND OF INVENTION

One type of tool consists of a simple shuttle with a guide head which makes it possible to open the sheathing and an orifice into which are passed the cables to be sheathed. This tool, however, is limited to use with cables of which one extremity at least is free. It does not therefore apply to cables which are already laid and which have their two extremities fixed, and it does not, moreover, allow passage of the sheath over branches from the bundle of strands. Bridging over of fittings or connectors presupposes making them pass into and through the orifice of the shuttle, which consequently then has to be oversized to accommodate them. Such a tool type is shown in JP-A-5742007 (Patent Abstracts of Japan Vol 6. No 112). A similar tool is shown in U.S. Pat. No. 4,593,442 but wherein the guide head, which extends through a longitudinal slit of the tubing, is formed in two separable grooved parts which co-operate to define an enclosed feed duct; the ability to split the guide head permits on the tool to be applied to, or separated from, a partially sheathed item without access to the end of the item, but such tool assembly/disassembly is not a trivial operation and not suited to a frequently necessary production step.

A second known type of tool consists of an articulated gripping jaw made up of two symmetrical parts held against each other by a spring. In the open position, the jaws allow the introduction of a bundle of cables to be sheathed into a duct. When in the closed position, two integral protuberances, one on each of the respective halves of the jaws which together form a head for expanding or otherwise opening the sheathing to be installed. The tool is then dragged along the bundle of cables to be sheathed. Any cable branch, joint or connector encountered interrupts the sheathing operation. The device must then be opened and the cables must be removed from it. Accommodate for connectors or fittings is to made by expanding and/or opening the sheathing manually, with the fingers, in order to carry out the sheathing operation. The tool is then re-introduced for sheathing the bundle as far as the next obstacle. It is apparent that this technique is hardly efficient if numerous branches or numerous connectors are present in the network to be sheathed. Moreover, this technique brings risk of injury to the user on the edges of a non-fabric split sheath, such as a plastic ringed sheath, or of pinching electric wires of small diameter by the jaws of the tool.

A third known tool consists of a handle, a guide head which opens or expands the split sheath and a semi-circular bar located at 60° to the head in the direction the tool moves forward. Traction of the tool then allows the introduction of cables into the sheathing. This arrangement brings the main inconvenience that the wires are subject to little guidance, can easily come out of the sheathing.

BRIEF SUMMARY OF THE INVENTION

The present invention thus intends to remedy these inconveniences by producing a sheathing tool which is more convenient and more efficient in use, and which even permits, for example, clearing obstacles like branches off the bundle of cables and which can be used on already laid networks where the wires do not have a free end.

According to a second aspect of the invention, this tool is made robust by assembling it in a single integral block, without movable parts.

The ergonomics of the tool and ease and rapidity of use constitute a third objective of the present invention.

In like manner, the possibility of mechanising the application of the sheathing bundle of cables constitutes a major advantage of the invention.

The tool of this invention similarly improves safety in use for its user by preventing the user from touching the possibly sharp edges of the sheath to be fitted, and this constitutes an additional advantage of the invention.

Finally, its suitability for different types of sheaths, such as split ringed plastic sheathing, textiles etc, constitutes another advantage of the device according to the invention.

According to the present invention, a device for inserting elongated items into a sheath which is slit longitudinally and has free edges extending approximately parallel to its axis, said device being capable of being moved in relation to the sheath in a direction generally parallel to said sheath, said device having a head comprising opening means for the sheath and which has, on the one hand, a first passage for the sheath during its relative movement in relation to the tool, and also a second passage for the elongated items in order to introduce them between the separated edges of the sheath, said second passage being located obliquely in relation to the axis of the head, characterised in that said head has a lateral passage which communicates with the second passage for the elongated items and which forms an angle with the axis of the head which is different from that formed between the axis of the second passage for the elongated items and the axis of the head, said lateral passage being adapted for the introduction or extraction of one or more elongated items during the movement of the sheath relative to the head of the tool.

It will be appreciated that the device of this invention is thus a device for the insertion of cables into a split sheath, either one of which is already split, or one which is split immediately prior to the sheathing operation; it is movable relative to the sheath, and it has a head which ensures the opening/expansion of the sheath; it features a channel for the cables to introduce them between the separated edges of the sheath, the latter channel being located obliquely in relation to the sheath and is characterised in that is has a lateral passage communicating with the channel for the cables, said lateral passage being disposed at an angle to this channel.

It will be understood that this arrangement also allows for the tool to be used on cables where the two extremities are fixed, and similarly to ensure the clearance of branches of cables without having to separate the tool from the sheath or from the cables to be sheathed. It therefore provides a good answer to problems caused by known tools constituting the state of the art. Such an implementation guarantees that cables which have a tendency because of their own mechanical structure to remain grouped around their axis, will not spontaneously come out of the tool during an insertion/sheathing operation. Consequently, their extraction or introduction (via the lateral passage) will remain very simple for the user.

According to one preferred embodiment, the tool is further characterised in that part at least of the surface of the passage for the elongated items, and/or of the passage for the sheath, and/or of the lateral passage, has a surface layer of a material with a reduced coefficient of friction.

According to a further feature of the invention, a preferred method of using a tool according to the invention comprises the steps of:

(a) presenting the tool to elongated items to be sheathed so as to introduce the latter to the second passage, (b) introducing the sheath to opening means via the first passage, (c) dragging the tool relative to the sheath and elongated items until the latter are enclosed by the sheath, (d) during step (c) introducing new or additional elongated items via the lateral passage, or extracting one or more items via said lateral passage.

It will be understood that these steps are compatible with mechanisation of the placing of the sheath onto the cables by dividing the process into at least three steps; namely bringing the items to the tool, putting the tool in position and then using the tool. As will be understood, only a tool which makes it possible to ensure that neither the cables nor the sheath need leave their paths is compatible with automation of the sheathing in this way. This is an important advantage with regard to previous known systems.

The reduction in friction obtained by treating the surface of the parts of the tool exposed to sliding friction, and preferably by having a small angle between the axis of the cables and the axis of the sheath contributes to the particularly advantageous implementation of the invention in automated form.

According to one especially advantageous method of operation, the process of sheathing furthermore includes the following stages:

clearance of joints or other obstacles disposed lengthwise of an elongated item, by extraction from the tool via the lateral passage, the elongated item(s) involved in the joint or obstacle followed by and continuation of the movement of the tool;

introduction into a group of elongated items a further elongated item which has to be inserted into the sheath, by introducing said further elongated item into the group via the lateral passage of the tool followed by continued dragging of the tool relative to the sheath and the elongated items.

The following description and drawings are intended to make it possible to better understand the aims and advantages of the invention. It will be understood that this description is given by way of example, and is not limiting in its nature.

BRIEF DESCRIPTION OF THE DRAWINGS

FIG. 1 shows a tool according to the invention during its use for the sheathing in a textile sheath of a group of wires which make up a branch of a wiring assembly, FIG. 2 shows the same tool in a perspective view, FIG. 3 is a front elevation in the direction of movement of the tool during use (direction III is indicated on FIG. 2), FIG. 4 shows the same tool seen from the rear (direction IV as indicated in FIG. 2), FIG. 5 shows a section through the tool to the right of the lateral passage (direction V indicated on FIG. 6), FIGS. 9A to 9E illustrate the steps of applying a sheath to a bundle of cables, FIG. 10 shows a variant of the device with a modification of the arrangement of the lateral opening with regard to the handle, the lateral opening being arranged downstream of the handle and no longer upstream of it, referred to the normal direction of movement of the tool, FIG. 11 illustrates another variant with two lateral passages to the right and to the left, FIG. 12 illustrates a further implementation of the tool in a variant which uses a wiring board.

DESCRIPTION OF THE INVENTION

Figure 6:
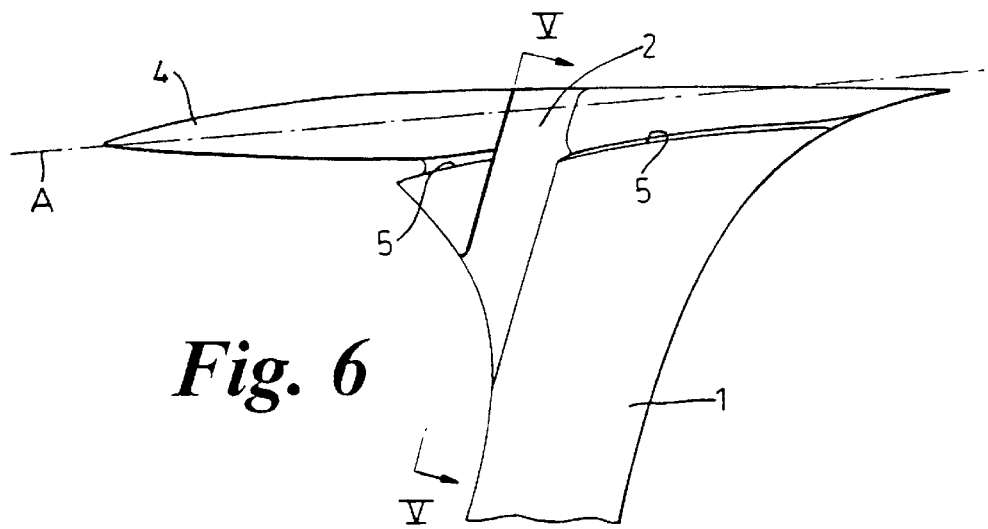
FIG. 6 is a side view of the tool.

As shown by FIG. 1, the device during use only has one gripping handle 1, by which the user communicates movement forward relative to the tool with regard to a bundle of cables 8, 9 in order to position them on the inside of a sheath 7. For the rest of this description, the terms 'in front of the tool' and 'behind the tool' will be used with reference to the relative direction of movement with regard to the sheath which is to be put on. As illustrated in FIG. 1, the angle α, formed between and an Axis A of the head of the tool, and the main direction of movement of the sheath on axis B for passage of the bundle of cables, is relatively small, of the order of 20°.

In more detail, as seen in FIG. 2, the device comprises two components which are the gripping handle 1 and sheath head 10. For a high degree of robustness, the device is preferably made in only one part, for example from aluminium, by methods known to the expert. It can be made by starting-from a block of aluminium 1 cm thick, cut according to the lateral shape of the tool, then drilled and/or machined. Manufacture by casting or any other traditional method is similarly conceivable.

Figure 7:
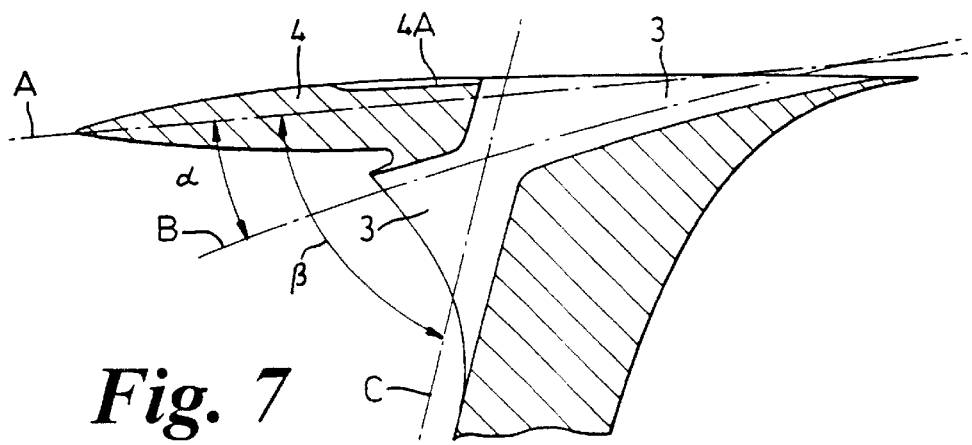
FIG. 7 is a section through the tool along the plane VI–VII of FIG. 8.
Figure 8:
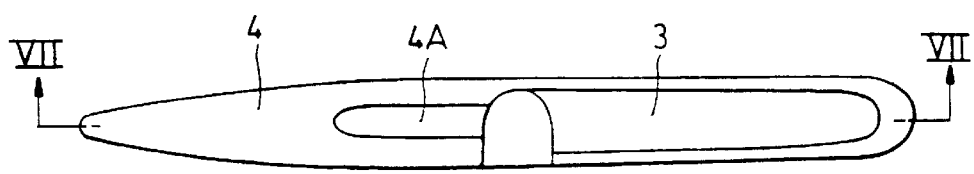
FIG. 8 shows a top view of the tool (direction VIII on FIG. 2)

The handle 1 has dimensions appropriate to proper holding of the tool in one hand. As illustrated, it comprises two faces which are approximately flat and has in this example a thickness of about 1 to 2 cm. The handle is preferentially orientated in a manner so that the tool will be pulled rather than pushed by the user along the cables or the sheath. This justifies an angle of the handle to the movement axis of the tool of the order of 60 to 75° (angle β FIG. 7). The handle comprises an attachment region 6, made in the form of a drilling of 1 cm diameter perpendicularly to the plane of the handle, and adapted for example to the passage of a chain or cord. This attachment region may be located either close to the sheath head 10, or alternatively, far from it, as illustrated in FIGS. 1 and 2 respectively. According to the proposed end use, the handle can be provided with an insulating sleeve, which thus ensures better safety to a user working on electrical installations.

The sheath head 10 comprises a guide head 4 intended to ensure the opening of the sheath and the retention of the sheath 7 along the tool. This guide head is of traditional shape, crescent-shaped in section to allow easy insertion into the sheath initially and without a cutting point in order to prevent risks of injuries to the user. In the case of sheaths of a diameter of the order of 1 cm, its length is from 4 to 5 cm, for a thickness of 6 mm and width of about 1 cm at its widest part, which determines the location where the sheath is opened to allow the passage of the wires to be inserted. This guide head is shown in front elevation in FIG. 3.

It is obvious that the dimensions of the head of the tool are directly related to the range of diameters of sheaths for which the tool is to be used, the traditional diameters of fabric sheaths for covering being 5, 8, 12, 20, 25 and 30 mm.

Reduced dimensions or greater dimensions are also conceivable, mainly as a function of the degree of opening required and the material from which the sheath is made up.

The sheath head 10 comprises a duct 3 intended for the passage or guidance of the bundle of cables 8 intended to be sheathed. This duct, the depth of which will decrease between its point of entry in front of the handle 1 under the head of the tool and its point of exit at the rear of the head of the tool, has a width characteristic of the maximum diameter of the group of wires or of the item which has to be sheathed. The width of the duct may be 8 mm for a tool adapted for textile sheaths intended to recover to 8 mm diameter. It may be made by drilling the metal block along an axis B, forming an angle $\alpha$ of about 20° to the axis A of the head (see FIG. 7), or directly during the casting of the part. It is desirable to reduce this angle a to limit friction of the cables and the sheath on the tool, as well as the forces needed to carry out the sheathing operation. The duct is made oval in order not to limit the maximum cross-section of the group of cables which can be sheathed by the useable width of the tool.

It can easily be understood, incidentally, that tools adapted for the passage of various maximum diameters of cables may be devised when modifying the dimensions of the sheath head 10 and duct 3. The duct typically has a length of 5 to 6 cm between the point of entry of the cables into the tool and the rear rim of the tool. According to the size of the tool, its length can, of course, be above or below these values.

The sheath head 10 has lateral grooves 5 which extend into the whole zone where the sheath is held open (FIGS. 4, 6) to allow insertion of cables to be sheathed. These grooves 5 are intended to hold the edges of the sheath 7 open, as can be seen in FIGS. 3 and 5. The grooves, with a depth of the order of 1 to 2 mm, made on the external lateral edges of the head of the tool, are interrupted about 1 cm before the rear edge of the duct to allow the sheath to be closed from the effect of its own elasticity.

The sheath head 10 is characterised by a lateral passage 2 intended for insertion into the duct 3 of additional items which are to be sheathed. This passage, located either on the right part or on the left part in the relative direction of feed (without effect on the functioning of the device), has a width approximately equivalent to the width of the duct 3, i.e. 5 mm in the example. This is clearly visible in FIG. 6. The axis C of this opening forms an angle $\beta$ with axis A of the tool head, clearly greater than the angle $\alpha$ formed between axis B of the conduit for the cables and the axis A of the head of the tool. An angle of opening from 50° to 60° can be used advantageously. This arrangement, visible in the section view FIG. 7, makes it possible to ensure that the cables, once they have been inserted into the tool and positioned along the axis of passage, cannot come out of it without the intervention of the user. Its function is to keep the wires in the tool. On the other hand, it is possible to extract (FIG. 1) one item 9 of an assembly 8 which has to be sheathed, as is the case in a situation of electrical cable branching, for example.

Finally, with the aim of preventing the open sheath from going into the lateral passage during its insertion into the tool because of its elasticity, instead of sliding on the external edges of the rear part of the head, the guide head has, at its widest part, placed immediately above the lateral opening, a not very deep hollow 4A on its upper surface. The depth of this shollow recess is preferably between 1 mm and a quarter of the diameter of the empty sheath.

During manufacture of the tool, the sheath head 10, the duct 3 and the lateral passage 2 are painted with a polymerisable paint, after which the tool is passed to an oven to cause polymerisation of the paint, with the aim of creating a reduced friction surface layer on the entry zones for the cables and the sheath, and to reduce the coefficient of friction of the tool on the cables and the sheath throughout the life of the tool. It is clear that this treatment, combined with a low angle $\alpha$ between the axis B of the duct 3 and the axis A of the head, contributes to reducing the friction between the cables and the sheath and the tool a great deal. The service life of the tool is distinctly increased.

The mode of operation of the device is very simple. The sheathing of cables is illustrated by FIGS. 9A to 9E, in which the relative positions of the sheath 7, the head of the tool 4, and of the bundle of cables 8 to be sheathed, at different levels along the tool, are shown in section.

To begin with, (FIG. 9A), the split sheath 7, for example a polyester textile sheath for re-covering (or a slit ringed sheath), of the type described in U.S. Pat. No. 5,413,149 and 5,556,495 in the name of the Bentley-Harris company, and used for the sheathing of electric cables, is placed in front of the guide head 4 of the tool and is progressively opened by this guide head (FIG. 9B). Simultaneously, the cables 8 to be sheathed are introduced into the tool by the lateral passage 2 and are orientated along the axis of passages B, which allows them to be held in the duct 3.

By using a sheath, the edges of which have a recovery of 90° (as shown in FIG. 9A), it is possible to sheath a bundle of cables of which the diameter is greater than 20% that of the empty sheath.

During the insertion of the sheath into the tool, the user presses down with one finger on the sheath at the level of the hollow 4A (FIG. 9C), to have the effect of forcing the edges of the sheath to stay apart so as to get over the lateral passage 2 and to engage the grooves 5 of the rear part of the head of the tool (FIG. 9D). This arrangement once again makes it possible to avoid having to manipulate the edges of the sheath, which are potentially sharp enough to cut, and increases the speed of carrying out the sheathing.

Whilst the sheath and the cables are then manually held in position at an initial point at the rear of the tool, relative movement of the tool along the cables to be sheathed is carried out, which thus causes the transfer of the cables to the inside of the sheath (FIG. 9D).

The guide grooves 5 for the sheath are interrupted at a place where the cables are already in position between the edges of the sheathing, and where the latter can thus be closed up again because of its own elasticity (FIG. 9E).

Extraction of one of the cables (as illustrated in FIG. 1) can be done via the lateral passage 2 when introducing the group to be sheathed via the lateral passage 2. This cable is then left transverse to the group of cables by the tool, whilst the remainder of the cables continue to be sheathed. In this way, a branch is achieved. In the same manner, clearing connectors or junctions can be achieved by extracting the cables concerned during the movement of the tool, or by integrating new cables into the group to be sheathed. The addition of cables to a group whilst sheathing is going on is done in a similar manner, by the introduction of item(s) by the lateral passage 2 and continuing the movement of the tool along the sheath. At the end of the zone to be sheathed, the cables are extracted from the tool by the lateral passage 2.

Another variant, illustrated in FIG. 10, comprises an arrangement of the handle 1 of the tool between the guide head 4 and lateral opening 2. The angle formed between the handle 1 and the direction of feed of the sheath 7 is here distinctly smaller, from 45° to 60°. This arrangement, which is less advantageous ergonomically, has great reliability for installing the sheathing. Because of the choice of the location of the handle in front of the duct 3' for the cables, the handle has a recess 3" which makes it possible to round off the elbow formed by the cables and thus permitting an easier passage of the cables during sheathing.

The method of use remains identical, namely insertion of the cables to be sheathed by the lateral passage 2' and positioning them in the duct 3, putting the sheath in front of the guide head 4 of the tool, feeding the sheath along the lateral grooves 5, then drawing to the rear of the tool the assembly of sheath and cables, accompanied by relative movement of the tool along the sheath bringing about the sheathing of the cables.

Yet another embodiment is illustrated in FIG. 11. In this variant, a right-hand and left-hand tool is achieved, by a modification of the front part of the tool and also of the lateral passages. The rear part of the tool is unaltered. In particular, the tool according to this variant comprises two lateral passages 2A, 2B, one for each side of the tool. These openings allow the insertion of cables into two ducts 3A, 3B, symmetrically disposed with regard to the plane formed by the head of the tool and its handle. These two ducts are merged into a single recess of decreasing depth in the rear part of the head. This recess is then identical to the rear part of the duct of the previously described version of the tool. The tool according to this variant is suitable for use equally by a right-handed or left-handed person.

Finally, in a variant shown diagrammatically in FIG. 12, the tool has, instead of the handle, a grip 21 with a length distinctly less than the said handle, for example on the order of half this length. This grip has one or more fastening points of the type whereby the tool made up in this way can be fitted on a wiring board 20, and has, if there is need, freedom of rotation around one or more axes 22. In the variant illustrated, forward movement in relation to the sheath (represented by an arrow in the sketch) relative to the tool is obtained by movement of the sheath 7, with, as distinct from the use in a mobile tool, the bundle of wires 23, 24 being held fixed on the wiring board, and ending in a connector 27. The wiring board traditionally has many supports for representative branches 25, 26 of the wiring, as they must be positioned after sheathing, for example in an automobile. In this use, the diameter of the bundle of wires to be sheathed must be less than that of the sheath by about 1 mm in order to allow the easy passage of the latter. The avoidance of the branches by the sheath is then done manually (or by means of another tool). Placing the sheath on by simultaneous movement of the sheath 7 and of the wires is similarly possible, according to circumstances.

The functions and principles of use of this embodiment on a wiring board consequently remain identical. The choice of the most suitable type of tool depends on matters of ergonomics, on user fatigue during the intensive use of the tool, and on the type of sheathing to be achieved, sheathing of already installed cables requiring instead a very mobile tool which can be manipulated by hand.

In an embodiment not illustrated here, automation of the sheathing is provided by incorporating the tool into a machine. This is made possible by the guarantee that the sheath and the wires to be sheathed will remain correctly positioned in the tool during the process of sheathing. The certainty that the sheathing process is made correctly without the need for continuous checking or human intervention guarantees that industrial use on great lengths of cables can be achieved.

This automatic sheathing, in a simple version, only involves segments of cables devoid of branching. Such a machine for sheathing includes at least one tool similar to that described above, equipment for unrolling the cables to be sheathed on the one hand, and the empty sheath on the other, upstream of the tool, and a means of relative movement of the sheath or the assembly of sheath and sheathed cables with regard to the tool. These means may consist of a gripping device and traction device for the sheathed assembly, which can be coiled.

In one preferred variant, the handle of the tool is tubular, like a hammer grip instead of having a generally rectangular section.

Likewise, in another variant, the tool is made of rigid, moulded plastic material, for example a non-flammable plastic of the "LEXAN"™ type, or of another electrically insulating material readily selectable by the expert.

In yet another variant, a sheath which has not previously been split can be used, the tool then being provided with a thin blade of conventional shape and manufacture, appropriately positioned between the sheath entry point and the region where the cables enter, thus making possible the cutting and opening of the sheath before the insertion of the cables.

In a further variant, enamelling or other surface treatment (in itself known), may be used to reduce the friction, instead of the polymerisable paint method mentioned earlier.

What is claimed is:

1. Device for insertion of elongated items into a tubular sheath having a longitudinally extending self-closing slit having edges, wherein insertion is accomplished by movement of the device longitudinally with respect to the slit, the device comprising:

an elongated head, having a longitudinal axis and top, bottom and sides, and including a guide portion disposed on said axis, said head being extendible through said longitudinal slit into said sheath to open said sheath by separating the edges of the slit and to guide said edges upon movement along the slit;

a feed duct for receiving elongated items, said feed duct extending through the head to said guide portion and having an axis located at a first angle obliquely disposed in relation to the longitudinal axis of the head, and a lateral passage, having a lateral opening to one of said sides of the device, said lateral passage intersecting the feed duct and communicating therewith for introduction into and extraction of elongated items out of said feed duct and being inclined with respect to the longitudinal axis of the head at a second angle different from the first angle.

2. Device according to claim 1, including a gripping handle which extends transversely in relation to the head of the device.

3. Device according to claim 2, wherein the gripping handle is made of an electrically insulating material.

4. Device according to claim 1, wherein said guide portion comprises a guide bush.

5. Device according to claim 1, wherein said guide portion comprises a pair of slit edge guidance grooves, each one of which being disposed laterally of, and extending longitudinally of, the head of the device for receiving and separating the slit edges of said sheath.

6. Device according to claim 1, wherein it is formed in one piece.

7. Device according to claim 1, wherein the lateral passage and said feed duct are in communication along their whole lengths to permit an item to be inserted into the lateral passage by way of its lateral opening and thereafter inclined relative to the head to extend along the feed duct.

8. Device according to claim 1, wherein a part, at least, of the surface of the feed duct, and/or of the guide portion, and/or of the lateral passage, is provided with a surface layer having a reduced coefficient of friction.

9. A method for insertion of elongated items into a tubular sheath having a longitudinally extending self-closing slit having side edges, wherein insertion is accomplished by movement of an insertion device longitudinally with respect to the slit, wherein the device comprises an elongated head, having a longitudinal axis and a top, bottom and sides, and including a guide portion disposed on said longitudinal axis, the device further comprising a feed duct for said elongated items extending through the head to said guide portion and having an axis located at a first angle obliquely disposed in relation to the longitudinal axis of the head, and a lateral passage, a lateral opening to said lateral passage through one of said sides of the head of said device, said lateral passage intersecting the feed duct and being inclined with respect to the longitudinal axis of the head at a second angle different from the first angle, wherein the method comprises the steps of:

(a) extending the head through said longitudinal slit into said sheath to open said sheath by separating the edges of the slit and to guide said edges upon movement along the slit;

(b) introducing elongated items into a lateral passage of the device and subsequently feeding said items into a feed duct extending through said device head, opening of the sheath by the guide portion and guiding of the sheath along the head of the device by effecting relative movement between the sheath and the device; and c) feeding the sheath relative to the device until the items are covered by virtue of relative movement of the sheath, or of the assembly of the sheath and items to be sheathed, with regard to the device.

10. Method according to claim 9, wherein said feeding step has a further stage as follows:

selectively extracting at least one of said elongated items via said lateral passage of the device and continuing of the relative movement of the device.

11. Method according to claim 9, wherein said feeding step has a further stage as follows:

introduction of an elongated item into the group of elongated items through the lateral passage of the device, accompanied by continuation of the relative movement of the device.

12. Method according to claim 9, wherein the relative movement of the sheath or the assembly of sheath and items to be sheathed by use of the device, is achieved by grasping the sheath at the rear of the device and applying traction to said sheath.

* * * * *